United States Patent [19]

Wunderlin

[11] 4,259,080

[45] Mar. 31, 1981

[54] METHOD OF DETERMINING DISCONTINUITIES IN THE HEAT EXCHANGER OF A WARM AIR FURNACE

[75] Inventor: James F. Wunderlin, West Bend, Wis.

[73] Assignee: Wisconsin Gas Company, Milwaukee, Wis.

[21] Appl. No.: 76,761

[22] Filed: Sep. 18, 1979

[51] Int. Cl.³ .................... G01N 31/00; G01N 33/00
[52] U.S. Cl. ............... 23/232 R; 23/230 L; 73/40.7; 422/86; 422/94
[58] Field of Search .......... 23/230 L, 232 R; 73/40.7; 422/86, 94

[56] References Cited

U.S. PATENT DOCUMENTS

| | | | |
|---|---|---|---|
| 2,017,951 | 10/1935 | Dasher | 23/232 R |
| 3,522,008 | 7/1970 | DeFabaugh et al. | 23/230 L |
| 3,945,244 | 3/1976 | Wormser et al. | 73/40.7 |
| 3,975,943 | 8/1976 | Bracket | 73/40.7 |
| 4,090,554 | 5/1978 | Dickinson | 23/230 L |

Primary Examiner—Michael Marcus
Attorney, Agent, or Firm—Andrus, Sceales, Starke & Sawall

[57] ABSTRACT

Method of determining discontinuites in the heat exchanger of a warm air furnace directed to spraying the burner within the furnace with a non-corrosive solution of sodium carbonate. The solution is sprayed on the burner after it is heated and in operation but with the blower fan inoperative. Thereafter a blue flame from a gas torch is played adjacent to or into a register or opening in the plenum of the furnace or an opening in the piping or duct work leading from the plenum. If the blue flame turns yellow this indicates there is a deleterious leakage of combustion gases from the heat exchanger of the furnace.

4 Claims, 1 Drawing Figure.

METHOD OF DETERMINING DISCONTINUITIES IN THE HEAT EXCHANGER OF A WARM AIR FURNACE

BACKGROUND OF THE INVENTION

Most methods used to detect holes or cracks in the heat exchanger of a warm air furnace unit are either unreliable or have undesirable side effects associated with the tests such as corrosion of the furnace parts, smoke or ordor. The present invention is directed to a method of detecting discontinuities in heat exchangers of warm air furnaces which is more reliable and eliminates the undersirable side effects of other tests.

SUMMARY OF THE INVENTION

In carrying out the methods of the invention a solution of about two ounces of a sodium compound such as non-corrósive sodium cabonate ($Na_2Co_3$) is mixed with a pint of water and placed in a hand pump sprayer. A location in the planum above the heat exchanger of the furnace unit is determined which opens to the atomosphere such as a register or an opening made in the plenum chamber itself or in the piping or ductwork leading therefrom. The furnace is turned on and allowed to heat up for several seconds and is then sprayed with the sodium carbonate before the blower fan comes on. The blue flame of a gas torch is then played into or adjacent the register or opening. If there are any discontinuities such as cracks or holes in the heat exchanger located above the burner the sodium vapor passing through the opening will turn the blue flame to a distinctive yellow color to thereby indicate a deleterious leakage of combustion gases from the heat exchanger of the furnace.

BRIEF DESCRIPTION OF THE DRAWING

The single

DETAILED DESCRIPTION OF THE INVENTION

Figure 1:
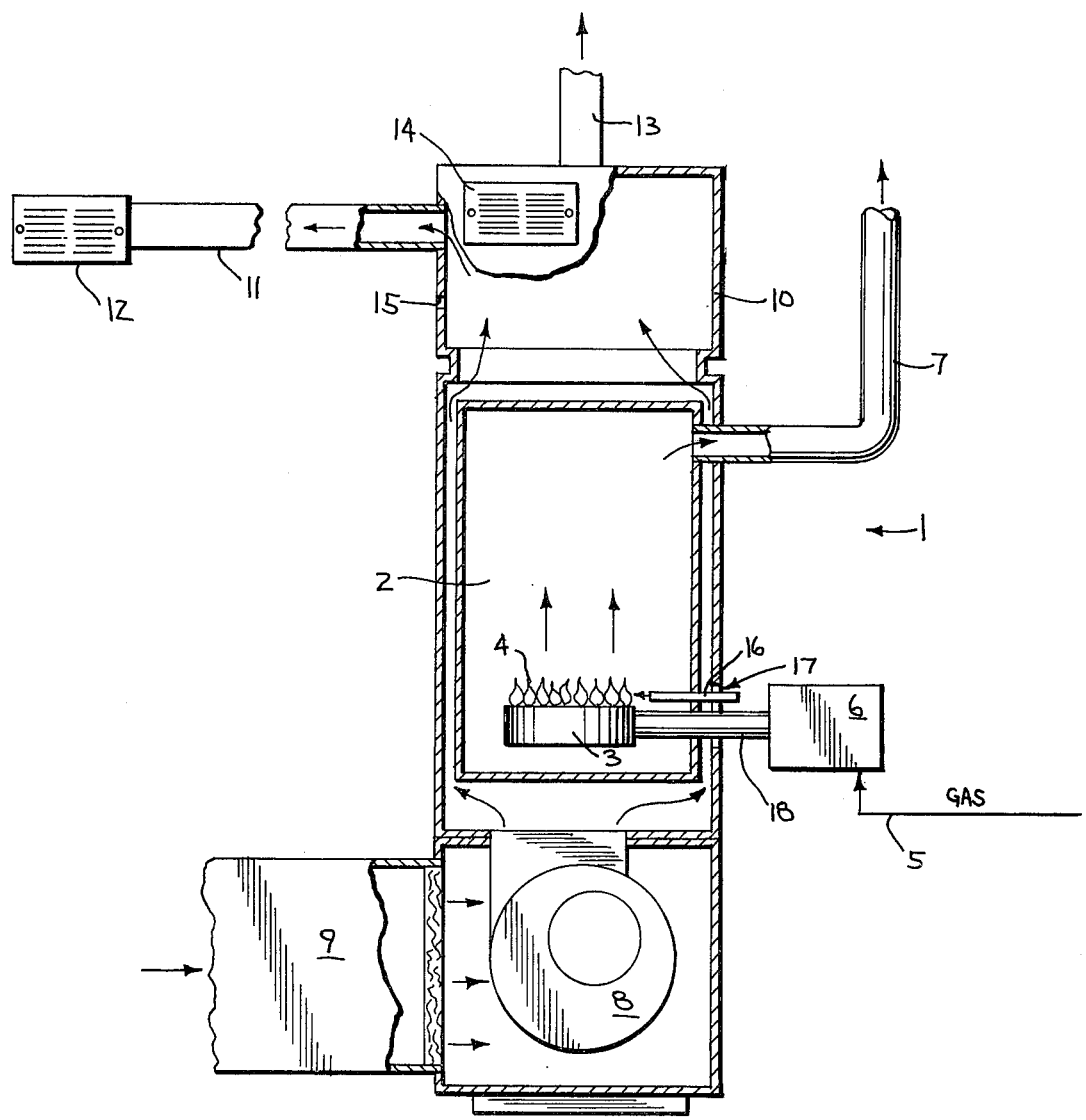
FIG. 1 is a front elevational view of a hot air heating furnace with parts broken away and sectioned.

Referring to the drawing there is shown a hot air furnace unit 1 which includes the heat exchanger 2. A gas burner 3 illustrated as having the flame 4 is supplied with gas through a line 5 connected to a gas source, not shown, and the controls 6 which are shown diagrammatically.

A flue pipe 7 is connected to the upper end of heat exchanger 2 for flow of exhaust gases to a chimney or the like for discharge to the atmosphere.

The blower 8 is commonly located below heat exchanger 2 as shown in the drawings and draws air through pipe 9 from the basement or the like, not shown, for discharge of forced air around heat exchanger 2 to pick up the heat therein for flow of heated air into plenum 10 located above heat exchanger 2 and which opens to the upper end of heat exchanger 2. The heated air flows from plenum 10 to the rooms of a building such as through piping or ductwork like piping 11 illustrated as taken off from the upper side portion of plenum 2 leading to room register or heated air outlet 12. Also there is illustrated piping 13 which leads from the top of plenum 10 to a room register or heated air outlet, not shown, for carrying hot air to the room into which piping 13 is connected.

In the single FIGURE of the drawing there is also illustrated a register or heated air outlet 14 which is connected to plenum 10 and may be employed as can the room registers, such as register 12 to carry out the test of the invention. If no register is located in plenum 10 and if it is desired to make the test of the invention in plenum 10, rather than through one of the described registers, then a small easily plugged hole 15, may be made in the plenum 10 and the test of the invention carried out through the use of such hole 15.

As a preparation for the test, a solution of about two ounces of the sodium compound, normally being a sodium carbonate ($Na_2Co_3$) spray solution is prepared and placed in a hand sprayer 16 shown diagrammatically in FIG. 1. A location in plenum 10 above heat exchanger 2 is determined for placement of the gas torch, not shown. If no opening or registers 12 and 14 are not available or desirable for the test, a small hole such, for example, ⅜ of an inch in diameter may be drilled in the plenum 10 such as hole or heated air outlet 15 which is located in a convenient area above heat exchanger 2. Hole 15, however, should not be drilled on the side of plenum 10 near the flue pipe 7. Leakage of the sodium compound through a hole adjacent the flue pipe 7 may give a false indication under the practice of the method of the invention.

The gas burner 3 is then turned on and allowed to heat up. In the case of a forced air furnace the test should be conducted with the blower 8 irroperative and consequently the furnace should be allowed to heat up below the "on" temperature of blower 8. The fan temperature switch may have to be reset higher during the test or the fan belt may be loosened temporarily.

With gas burner 3 operating, as illustrated in the drawing, the sodium compound solution is sprayed onto burner 3 from hand sprayer 16 which can be inserted into heat exchanger 2 through the opening 17 around the supporting gas piping 18 extending between gas burner 3 and controls 6. The gas torch is then immediately placed in the opening of hole 15 in plenum 10 or located adjacent registers 12 or 14. The gas discharged from the troch may, for example, be propane, butane or methane.

If there are any discontinuities in heat exchanger 2 above burner 3 the sodium vapor carried by the warm air and leaking through the opening will turn the blue flame to a distinctive yellow color.

As a precaution to prevent a false indication of a leak by the test, a trial test with the gas flame can be conducted before the sodium compound solution is sprayed onto the burner 3. The blue flame should remain a blue color. If the flame turns yellow before application of the sodium spray, this indicates that dust or other foreign substance is causing the color change. In a few seconds the dust should clear and the gas flame return to a blue color.

The sodium spray will not readily detect leaks below the burner as the air flow is from the areas surrounding the heat exchanger into the combustion area. A partial visual inspection can be made of this area of heat exchanger 2. Flame disturbance or pilot outage may be an indication of a leak in the lower area of a heat exchanger 2.

The invention provides a tracer agent and a tracer detection device and method which provides a reliable inexpensive and non-corrosive test for leakage through discontinuities in warm air furnaces. The method can be applied to a furnace with either a cylindrical or sectional type of heat exchanger.

The furnace unit described herein includes the warm air furnace as well as the piping and room registers and in the plenum.

Various modes of carrying out the invention are contemplated as being within the scope of the following claims, particularly pointing out and distinctly claiming the subject matter which is regarded as the invention.

I claim:

1. A method of determining discontinuities in a heat exchanger of a warm air furnace unit comprising igniting a burner of a heat exchanger of a warm air furnace unit to thereby heat up the furnace while maintaining a blower fan inoperative, spraying the burner with a non-corrosive solution of a sodium compound while the furnace unit continues to operate, contacting the air in an indirectly heated zone, downstream of the heat exchanger, with a blue flame of a torch, and checking the flame of the torch to ascertain whether the blue flame turns yellow, thereby indicating a deleterious leakage of combustion gas from the heat exchanger of the furnace.

2. The method of claim 1, and the non-corrosive solution of the sodium compound being a combination of water and sodium carbonate.

3. The method of claim 2, and the solution of claim 2 being a mixture in the relationship of about two ounces of sodium carbonate mixed with a pint of water.

4. The method of claim 1, and the blue flame in the torch being provided by a gas from propane, butane or methane.

* * * * *